United States Patent Office 3,019,252
Patented Jan. 30, 1962

3,019,252
PROCESS FOR THE PREPARATION OF NOVEL DERIVATIVES OF CYCLOPENTANONAPHTHALENE AND PRODUCTS OBTAINED THEREBY
Gerard Nomine, Noisy-le-Sec, and Daniel Bertin, Montrouge, France, assignors to Les Laboratoires Francais de Chimiotherapie, Paris, France, a corporation of France
No Drawing. Filed June 15, 1960, Ser. No. 36,171
Claims priority, application France June 18, 1959
9 Claims. (Cl. 260—476)

The present invention relates to a process for the preparation of novel derivatives of cyclopentanooctahydronaphthalene and the novel products as well as the intermediates thus obtained.

More particularly, it relates to a process for the preparation of novel $\Delta^{8(9)}$-3-methyl-7-oxo-8-(3'-oxo-butyl)3,4-[3'-acyloxy-cyclopentano-(2',1')]-octahydronaphthalene compounds, of the formula III:

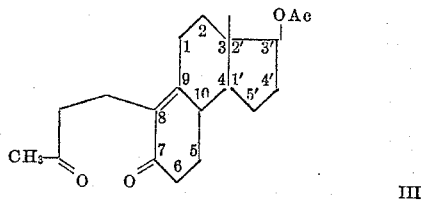

III wherein Ac represents an acyl radical of an organic hydrocarbon carboxylic acid having from 1 to 18 carbon atoms.

These novel cyclopentanonaphthalene derivatives are intermediate products used for the synthesis of steroids and analogous compounds. Thus, after reduction of the 8(9)-ethylene bond, by intramolecular condensation between the carbonyl in the 7-position and the terminal methyl group of the side chain, it is possible to obtain different esters of 19-nortestosterone.

An object of the present invention is the production of novel derivatives of cyclopentano-octahydronaphthalene useful in the production of 19-nortestosterone.

Another object of this invention is the production of $\Delta^{8(9)}$ - 3 - methyl-7-oxo-8-(3'-oxobutyl)-3,4-[3'-acyloxy-cyclopentano-(2',1')]-octahydronaphthalene compounds having the structural formula:

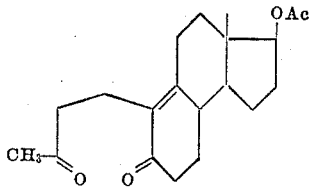

where Ac represents an acyl radical of an organic hydrocarbon carboxylic acid having from 1 to 18 carbon atoms.

A further object of the invention is the development of a process for production of $\Delta^{8(9)}$-3-methyl-7-oxo-8-(3'-oxobutyl) - 3,4-[3'-acyloxy-cyclopentano-(2',1')]-octahydronaphthalene compounds having the structural formula:

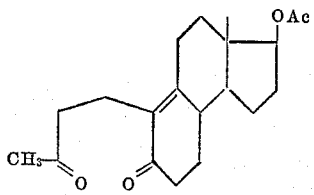

where Ac represents an acyl radical of an organic hydrocarbon carboxylic acid having from 1 to 18 carbon atoms.

A still further object of the invention is the production of the intermediate $\Delta^{9(10)}$-3-methyl-7-oxo-8-(3'-chloro-2'-butenyl) - 3,4-[3'-acyloxy-cyclopentano-(2',1')]-octahydronaphthalene compounds having the structural formula:

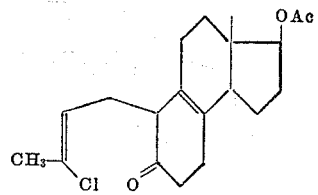

where Ac represents an acyl radical of an organic hydrocarbon carboxylic acid having from 1 to 18 carbon atoms.

These and other objects of the invention will become more apparent as the description thereof proceeds.

The process for the preparation of the compounds of formula III consists essentially of condensing the $\Delta^{9(10)}$-3 - methyl - 7-oxo-3,4-[3'-acyloxy-cyclopentano-(2',1')]-octahydronaphthalene compounds, of the formula I:

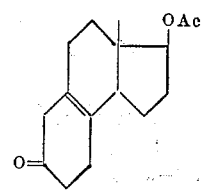

I wherein Ac represents an acyl radical of an organic hydrocarbon carboxylic acid having from 1 to 18 carbon atoms, with 1,3-dichloro-2-butene in the presence of an alkaline condensation agent and treating the resulting $\Delta^{9(10)}$-3-methyl - 7 - oxo-8-(3'-chloro-2'-butenyl)-3,4-[3'-acyloxy-cyclopentano-(2',1')]-octahydronaphthalene compounds, of the formula II:

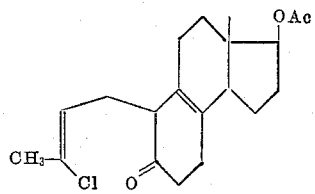

II wherein Ac has the previously defined meaning, with hydrolyzing agents to obtain the desired compound III.

Table 1 discloses the reaction scheme of the invention.

Table 1

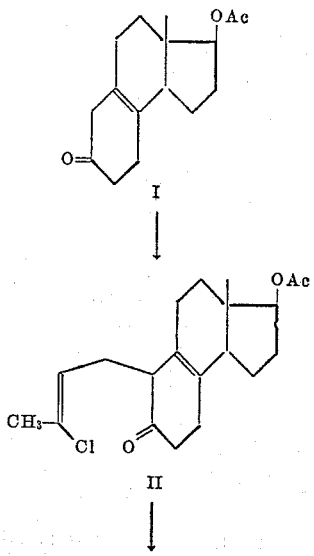

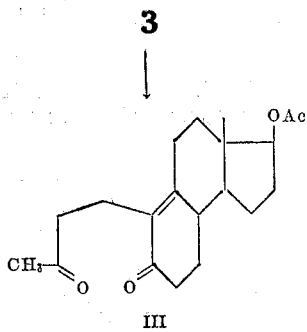

Ac=acyl radical of an organic hydrocarbon carboxylic acid having from 1 to 18 carbon atoms.

The starting compounds of the Formula I are obtained according to the process described in the copending, commonly-assigned U.S. patent application Serial No. 6,111, filed February 2, 1960, by subjecting $\Delta^{6(7),9(10)}$-3-methyl-7-alkoxy-3,4-[3'-acyloxy-cyclopentano-(2',1')]-hexahydro-naphthalene compounds of the formula:

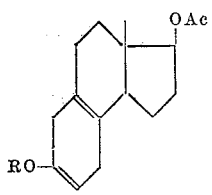

wherein R is a lower alkyl radical and Ac has the meaning defined above, to hydrolysis with the aid of organic carboxylic acids, in solution in an inert solvent at elevated temperatures. Preferably oxalic acid or acetic acid are used as hydrolyzing agents in the presence of ethanol at temperatures from about 40° to 80° C. and thereafter the desired ketone I is isolated by means of customary procedures.

A preferred mode of execution of the process of the invention is to employ the benzoic acid ester of starting compound I, but other esters of organic hydrocarbon carboxylic acids having 1 to 18 carbon atoms such as the alkanoates and alkenoates, for example, the acetate, the trimethylacetate, the propionate, the 4,4-dimethyl-pentanoate, the 10-undecenoate; the cycloalkyl alkanoates, for example, the β-cyclopentylpropionate; the arylalkanoates, the phenyl-propionate; the cycloalkanoates, the hexahydrobenzoate, the hexahydroterephthalate; and other phenyl-carboxylic acids may also be used without departing from the scope of the invention.

The condensation with 1,3-dichloro-2-butene takes place in the presence of an alkaline condensation agent, preferably in the presence of an inert organic solvent. The preferred alkaline condensation agents are the alkali metal alcoholates such as sodium tertiary-amylate, sodium ethylate and sodium triphenylmethylate. The preferred inert organic solvents are the benzene hydrocarbons such as toluene; ethanol and ether. It is preferable to utilize a solvent that is fully compatible with the alkaline condensation agent, such as sodium tertiary-amylate with toluene, sodium ethylate with ethanol or sodium triphenylmethylate with ether. However, the solvents and the condensation agents can be interchanged. The condensation is preferably carried out at temperatures above room temperature to the reflux temperature.

The hydrolysis of the 3'-chloro-2'-butenyl side chain can be effected with any hydrolyzing agent that will cause the chlorine radical to be replaced with a hydroxyl radical and will simultaneously cause the enolic hydroxy group formed to revert to the more stable ketone. It is preferred to use a concentrated aqueous solution of a strong mineral acid such as concentrated sulfuric acid. The reaction occurs at room temperature.

Compounds of the Formula III prepared by the present invention are seen as novel industrial products, but the invention is naturally extended to the intermediate products of Formula II, also used in the present invention.

The following example illustrates the invention. It is, however, not to be construed as providing any limiting characteristics. The temperatures are given in degrees centigrade.

EXAMPLE

Preparation of $\Delta^{8(9)}$-3-methyl-7-oxo-8-(3'-oxobutyl)-3,4-[3'-benzoyloxy-cyclopentano-(2',1')]-octahydronaphthalene, III (Ac=benzoyl)

(a) CONDENSATION 649 mgm. of compound I, wherein Ac=benzoyl, are dissolved in 13 cc. of anhydrous toluene. Compound I is obtained according to the process described in the aforesaid U.S. patent application Serial No. 6,111.

To the solution of compound I, heated to 70° C. under agitation and in an atmosphere of nitrogen, is added 1.2 cc. of a 1.68 N solution of sodium tertiary-amylate in toluene. A yellow precipitate is formed. 250 mgm. of 1,3-dichloro-2-butene in 7 cc. of anhydrous toluene are added. The precipitate disappears rapidly and the heating is continued for half an hour. After cooling, 10 cc. of ether and 10 cc. of water are added thereto and the mixture is decanted. The aqueous phase is extracted with ether, then the ether phases are combined and dried. By distillation in vacuo, 800 mgm. of a yellow oil, consisting of the raw condensation product $\Delta^{9(10)}$-3-methyl-7-oxo-8-(3'-chloro-2'-butenyl)-3,4-[3'-benzoyloxycyclopentano-(2',1')]-octahydronaphthalene of Formula II, Ac=benzoyl, are isolated from the organic phase. The product is chromatographed over silicagel and eluted with methylene chloride containing an increasing percentage of acetone (from 0.2% to 5%). The fraction corresponding to the mixture containing 0.4% acetone contains 41% of the condensation product. The condensation product is very soluble in alcohol, ether, acetone, benzene and chloroform, insoluble in water. It has an ultraviolet spectrum of:

max. 230 m$\mu$, $E^{1\%}_{1cm.}$=380; inflection 272 m$\mu$, $E^{1\%}_{1cm.}$=35; max. 280.5 m$\mu$, $E^{1\%}_{1cm.}$=27.5; max. 302 m$\mu$, $E^{1\%}_{1cm.}$=10.7

It is not described in the literature.

(b) HYDROLYSIS 249 mgm. of $\Delta^{9(10)}$-3-methyl-7-oxo-8-(3'-chloro-2'-butenyl)-3,4-[3'-benzoyloxy-cyclopentano-(2',1')]-octahydronaphthalene of Formula II, Ac=benzoyl, are triturated in 1 cc. of concentrated sulfuric acid (d=1.84); hydrochloric acid is evolved. The mixture is agitated for 20 minutes, next, several cc. of methylene chloride are added, then sodium bicarbonate is added until no more gas is evolved. 228 mgm. (that is 96% of theory) of a brown gum are obtained, which is chromatographed over silicagel. By elution with methylene chloride containing 3% acetone, 115 mgm. (that is 48.5% of theory) of $\Delta^{8(9)}$-3-methyl-7-oxo-8-(3'-oxobutyl)-3,4-[3'-benzoyloxy-cyclopentano-(2',1')]-octahydronaphthalene of Formula III, Ac=benzoyl, is obtained. It is recrystallized in 3 volumes of 80% ethanol and 89 mgm. (that is 77% of theory) of white crystals in the form of platelets are obtained, having a melting point of 98° C. The pure product melts at 99° C.; it is very soluble in alcohol, acetone, benzene and chloroform, less soluble in ether and insoluble in water. The ultraviolet spectrum:

max. 237 m$\mu$, $E^{1\%}_{1cm.}$=557, inflection 250 m$\mu$, $E^{1\%}_{1cm.}$=445; inflection 280 m$\mu$, $E^{1\%}_{1cm.}$=27

The compound is not described in the literature.

The preceding example is not to be construed as limiting the invention. It is evident to one skilled in the art that temperatures, the nature of the solvents or the organic carboxylic acid ester may be varied or that equivalent techniques may be used without departing from the spirit of the invention or the scope of the appended claims.

We claim:
1. The $\Delta^{8(9)}$-3-methyl-7-oxo-(3'-oxobutyl)-3,4-[3'-acyloxy-cyclopentano-(2',1')]-octahydronaphthalene compounds of the formula:

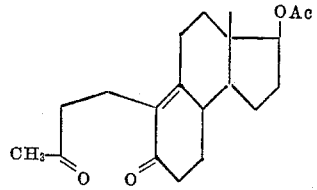

where Ac and acyl represent an acyl radical of an organic hydrocarbon carboxylic acid having from 1 to 18 carbon atoms.

2. $\Delta^{8(9)}$-3-methyl-7-oxo-8-(3'-oxobutyl)-3,4-[3'-benzoyloxy-cyclopentano-(2',1')]-octahydronaphthalene.

3. $\Delta^{9(10)}$-3-methyl-7-oxo-8-(3'-chloro-2'-butenyl)-3,4-[3'-acyloxy-cyclopentano-(2',1')]-octahydronaphthalene compounds of the formula:

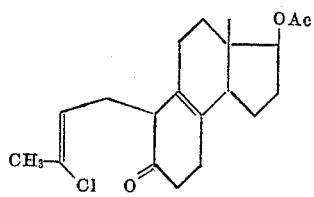

where Ac and acyl represent an acyl radical of an organic hydrocarbon carboxylic acid having from 1 to 18 carbon atoms.

4. $\Delta^{9(10)}$-3-methyl-7-oxo-8-(3'-chloro-2'-butenyl)-3,4-[3'-benzoyloxy-cyclopentano-(2',1')]-octahydronaphthalene.

5. A process for preparation of $\Delta^{8(9)}$-3-methyl-7-oxo-8-(3'-oxobutyl)-3,4-[3'-acyloxy-cyclopentano-(2',1')]-octahydronaphthalene compounds of the formula.

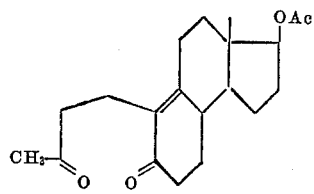

wherein Ac and acyl represent an acyl radical of an organic hydrocarbon carboxylic acid having from 1 to 18 carbon atoms, which comprises condensing a $\Delta^{9(10)}$-3-methyl-7-oxo-3,4-[3'-acyloxy-cyclopentano-(2',1')]-octahydronaphthalene compound of formula:

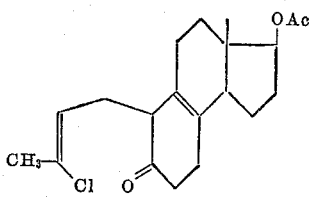

wherein Ac and acyl have the meaning previously assigned with 1,3-dichloro-2-butene in the presence of an alkali metal alcoholate condensation agent in an inert organic solvent at a temperature up to the reflux temperature, hydrolyzing the resulting $\Delta^{9(10)}$-3-methyl-7-oxo-8-(3'-chloro-2'-butenyl)-3,4-[3'-acyloxy-cyclopentano-(2',1')]-octahydronaphthalene compound of the formula:

wherein Ac and acyl have the meaning previously assigned, with a concentrated aqueous solution of a strong mineral acid and recovering said $\Delta^{8(9)}$-3-methyl-7-oxo-8-(3'-oxobutyl)-3,4-[3'-acyloxy-cyclopentano-(2',1')]-octahydronaphthalene compounds.

6. The process of claim 5, wherein said alkali metal alcoholate condensation agent is sodium tertiary-amylate and said inert organic solvent is a benzene hydrocarbon.

7. The process of claim 5, wherein said alkali metal alcoholate condensation agent is sodium ethylate and said inert organic solvent is ethanol.

8. The process of claim 5, wherein said alkali metal alcoholate condensation agent is sodium triphenylmethylate and said inert organic solvent is ether.

9. The process of producing $\Delta^{8(9)}$-3-methyl-7-oxo-8-(3'-oxobutyl)-3,4-[3'-benzoyloxy-cyclopentano-(2',1')]-octahydronaphthalene, which comprises condensing $\Delta^{9(10)}$-3-methyl-7-oxo-3,4-[3'-benzoyloxy-cyclopentano-(2',1')]-octahydronaphthalene with 1,3-dichloro-2-butene in the presence of sodium tertiary-amylate and toluene at a temperature up to the reflux temperature, hydrolyzing the resulting $\Delta^{9(10)}$-3-methyl-7-oxo-8-(3'-chloro-2'-butenyl)-3,4-[3'-benzoyloxy-cyclopentano-(2',1')]-octahydronaphthalene with concentrated aqueous sulfuric acid and recovering said $\Delta^{8(9)}$-3-methyl-7-oxo-8-(3'-oxobutyl)-3,4-[3'-benzoyloxy-cyclopentano-(2',1')]octahydronaphthalene.

References Cited in the file of this patent

Julia: Compt. Rend., vol. 237, pages 913–15 (1953).
Julia: Bull. Soc. Chim., France (1954), pages 780–9.
Nazarov et al.: Zhur. Obshchei Khim, vol. 26, pages 819–32 (1956).